(12) United States Patent
Ramasubramanian et al.

(10) Patent No.: US 6,172,672 B1
(45) Date of Patent: *Jan. 9, 2001

(54) METHOD AND SYSTEM FOR PROVIDING SNAPSHOTS FROM A COMPRESSED DIGITAL VIDEO STREAM

(75) Inventors: Narayanan Ramasubramanian, San Jose, CA (US); Michael D. Aronson, Lexington, MA (US)

(73) Assignee: SeeItFirst.com, Fremont, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/769,495

(22) Filed: Dec. 18, 1996

(51) Int. Cl.$^7$ ........................................... H04N 7/14
(52) U.S. Cl. ........................ 345/327; 345/328; 348/18; 348/13; 348/399
(58) Field of Search .................... 348/399, 327, 348/390, 68, 386, 19, 432, 440, 459, 18, 22, 23, 24, 12, 13, 7; 395/200.68, 200.42; 345/327, 328; 386/69–70, 125–126

(56) References Cited

U.S. PATENT DOCUMENTS

| | | | |
|---|---|---|---|
| 3,333,056 | * 7/1967 | Pratt | 348/397 |
| 3,781,477 | 12/1973 | Johnannesson | 179/2 TV |

(List continued on next page.)

OTHER PUBLICATIONS

Wu–chi Feng, "Video–On–Demand Services: Efficient Transportation and Decompression of Variable Bit Rate Video", Ph.D. Thesis, University of Michigan, Apr. 1996, 2 pages.

Description of VDOnet Corp. technology, located at http://www.vdo.net/corporate/overview/technology.html on Aug. 21, 1997, 6 pages.

Patent Abstracts from search performed on Aug. 21, 1997, 22 pages.

* cited by examiner

*Primary Examiner*—Andrew I. Faile
*Assistant Examiner*—Reuben M. Brown
(74) *Attorney, Agent, or Firm*—Hickman Palermo Truong & Becker, LLP; Brian D. Hickman; Carl L. Brandt

(57) ABSTRACT

A method and system are provided for delivering video from a client to a server over a communication medium with a limited bandwidth. An initial image quality that allows the video to be displayed in real time at the client is determined based on a predetermined frame rate and the limited bandwidth. Video having the initial image quality is transmitted to the client. While transmitting the video to the client, the server receives a message from the client that indicates selection of a second frame rate that is slower than the predetermined frame rate. In response to the message from the client, the server determines a second image quality that allows the video to be displayed in real time at the client based on the second frame rate and the limited bandwidth. The second image quality is higher than the initial image quality. The video with the second image quality is then transmitted to the client. A "snapshot" feature is also provided. A predetermined user input is received at the client. In response to the predetermined user input at the client, a message is transmitted from the client to the server that indicates a particular frame in the video. In response to receiving the message at the server, the server transmits to the client data depicting an image represented in the frame, wherein the data represents the image in greater detail than the image is represented in the frame of the video.

30 Claims, 5 Drawing Sheets

U.S. PATENT DOCUMENTS

| | | | |
|---|---|---|---|
| 4,009,330 | * 2/1977 | Cutler et al. | 348/22 |
| 4,924,303 | 5/1990 | Brandon et al. . | |
| 5,079,630 | * 1/1992 | Golin et al. | 348/399 |
| 5,138,447 | * 8/1992 | Shen et al. | 358/133 |
| 5,208,665 | 5/1993 | McCalley et al. . | |
| 5,262,860 | 11/1993 | Fitspatrick et al. . | |
| 5,357,276 | * 10/1994 | Banker et al. | 455/4.2 |
| 5,384,598 | * 1/1995 | Rodriguez et al. | 348/439 |
| 5,416,520 | 5/1995 | Kuzma | 348/409 |
| 5,461,619 | * 10/1995 | Citta et al. | 370/83 |
| 5,534,942 | 7/1996 | Beyers, Jr. et al. | 348/569 |
| 5,561,637 | 10/1996 | Dan et al. | 365/230.03 |
| 5,572,654 | * 11/1996 | Coelho | 348/439 |
| 5,581,297 | 12/1996 | Koz et al. | 348/152 |
| 5,596,705 | * 1/1997 | Reimer et al. | 395/326 |
| 5,604,731 | * 2/1997 | Grossglauser | 370/23 |
| 5,608,446 | 3/1997 | Carr et al. . | |
| 5,614,940 | 3/1997 | Cobbley et al. . | |
| 5,617,135 | 4/1997 | Noda et al. . | |
| 5,621,429 | 4/1997 | Yamaashi et al. | 345/119 |
| 5,633,686 | 5/1997 | Boden | 348/441 |
| 5,642,160 | 6/1997 | Bennett | 348/156 |
| 5,644,714 | 7/1997 | Kikinis . | |
| 5,673,205 | 9/1997 | Brunson . | |
| 5,689,800 | 11/1997 | Downs . | |
| 5,696,905 | 12/1997 | Reimer et al. . | |
| 5,703,965 | * 12/1997 | Fu et al. | 382/232 |
| 5,737,552 | * 4/1998 | Lavalle et al. | 348/13 |
| 5,754,700 | * 5/1998 | Kuzma | 382/236 |
| 5,754,773 | * 5/1998 | Ozden et al. | 395/200.33 |
| 5,790,174 | * 8/1998 | Richard, III et al. | 348/7 |
| 5,793,414 | * 8/1998 | Shaffer | 348/13 |
| 5,793,415 | * 8/1998 | Gregory, III et al. | 348/15 |
| 5,819,048 | * 10/1998 | Okazaki et al. | 348/19 |
| 5,821,986 | * 10/1998 | Yuan et al. | 348/17 |
| 5,822,541 | * 10/1998 | Nonomura et al. | 395/200.77 |
| 5,828,371 | * 10/1998 | Cline et al. | 345/328 |
| 5,990,931 | * 11/1999 | Nimri et al. | 348/15 |

METHOD AND SYSTEM FOR PROVIDING SNAPSHOTS FROM A COMPRESSED DIGITAL VIDEO STREAM

FIELD OF THE INVENTION

The present invention relates to digital video delivery systems, and more specifically, to providing snapshots from a digital video stream.

BACKGROUND OF THE INVENTION

In recent years, the media industry has expanded its horizons beyond traditional analog technologies. Numerous systems have been developed for transmitting video information digitally from one location to be viewed in real time at another location. One difficulty associated with providing video data in digital format is the bandwidth required to deliver a high quality picture in real time. Consequently, many techniques have been developed for compressing the representation of digital video. However, the more compressed the digital video stream, the more information that is lost in the compression process and the lower the quality of the video image displayed to the viewer.

To compensate for low bandwidth, video may be delivered with fewer frames per second and/or with less resolution. It is not uncommon for digital video to be delivered in resolutions that are significantly smaller than the resolution supported by the device being used to view the video. For example, real-time video is often delivered in 120 by 160 pixel resolution, when most digital viewing devices support resolutions of 640 by 480 and above.

Various video compression techniques have been developed. One popular compression technique is known as wavelet transform, which is described in many publications including "A VLSI Architecture for Real-Time Hierarchical Encoding/Decoding of Video Using the Wavelet Tranform", Mohan Vishwanath, Chaitali Chakrabarti, ICASSP 1994, and VLSI Architecture for Discrete Wavelet Transforms", Parhi, Keshab; Nishitani, Takao IEEE Transactions on Very Large Scale Integration (VLSI) Systems, vol. 1, No. 2, June 1993. Another popular compression technique is known as MPEG compression, which follows international standards: ISO/IEC 13818-1, 2, 3 (MPEG-2) and ISO/IEC 11172-1, 2, 3 (MPEG-1). Documents that describe these standards are available from ISO/IEC Copyright Office Case Postale 56, CH 1211, Geneve 20, Switzerland.

Different compression techniques require different amounts of computational power to perform compression. If a video server has enough computational power, digital video may be compressed during the delivery of the digital video to a viewer in real time ("on the fly"). If a video server does not have enough computational power to perform on-the-fly compression, digital video may be pre-compressed before real-time delivery of the video begins.

Typically, a video server that delivers digital video that is compressed on-the-fly will determine the bandwidth available to send the video to a particular destination (the "client") before initiating the transmission of the video. The video server will then select a compression ratio based on the available bandwidth. For example, a higher compression ratio will be selected to deliver video to a client that is connected to the server through a 14.4K baud modem than will be selected to deliver video to a client that is connected to the server through a 28.8K baud modem. This compression ratio will typically be in effect for the duration of the delivery of video to that particular client.

A video server that delivers digital video that is pre-compressed may not be free to adjust the compression ratio of a stream of digital video data based on the bandwidth to a particular client. Consequently, digital video that is pre-compressed is often pre-compressed with low-bandwidth clients in mind. Thus, even highbandwidth clients often receive low-resolution, low-quality video images.

Often, users would like to be able to create a "snapshot" of the video image that is being supplied to a client. For example, the video may be of a basketball game and the user may wish to have a snapshot of a star player making a slam dunk. The ability to create snapshots may also be useful for business situations. For example, it may be desirable to have a snapshot of a diagram or white board that is momentarily displayed during a video conference.

Using current technology, such snapshots can be created by performing a "screen capture" or "screen dump" while the desired image is being displayed to the viewer. Unfortunately, the size and quality of such snapshots will be no better than the size and quality of the video image as it is delivered in real time. As explained above, the quality of the real time image is reduced by the constraints imposed by the need to supply the video image in real time over a narrow bandwidth.

Video capture mechanisms that produce digital photographs from analog video signals generated from external video devices have been developed. However, such mechanisms generally do not work with digital input. Further, such hardware mechanisms do not have to address the quality limitations associated with the realtime delivery of digital video over media with limited bandwidths. In addition, such video capture mechanisms require the recipient of the photograph to acquire special additional hardware.

Based on the foregoing, it is clearly desirable to provide a mechanism that allows a user to obtain a snapshot of a video image, where the snapshot has a size and quality that is not dictated by the bandwidth between the video server and the client. It is further desirable to increase the quality of the video image received by a client with a limited bandwidth in response to conditions that allow the higher quality image to be sent over the limited bandwidth.

SUMMARY OF THE INVENTION

A method and system are provided for delivering video from a client to a server over a communication medium with a limited bandwidth. According to one aspect of the invention, an initial image quality that allows the video to be displayed at the client is determined based on a predetermined frame rate and the limited bandwidth. Video having the initial image quality is transmitted to the client. While transmitting the video to the client, the server receives a message from the client that indicates selection of a second frame rate that is slower than the predetermined frame rate. In response to the message from the client, the server determines a second image quality that allows the video to be displayed in real time at the client based on the second frame rate and the limited bandwidth. The second image quality is higher than the initial image quality. The video with the second image quality is then transmitted to the client.

According to another aspect of the invention, a stream of video is transmitted from the server to the client. A predetermined user input is received at the client. In response to the predetermined user input at the client, a message is transmitted from the client to the server that indicates a particular frame in the video. In response to receiving the message at the server, the server transmits to the client data depicting an image represented in the frame, wherein the data represents the image in greater detail than the image is represented in the frame of the video.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing high quality snapshots that correspond to frames from a lower-quality video stream is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

The present invention is not limited to any particular type of digital video format. Therefore, embodiments of the invention will be described for both on-the-fly and pre-compressed digital video delivery systems. An exemplary video display system that uses on-the-fly compression is illustrated in FIG. 1A, while an exemplary video display system that delivers pre-compressed video data is illustrated in FIG. 1B.

ON-THE-FLY VIDEO DELIVERY SYSTEMS

Figure 1A:
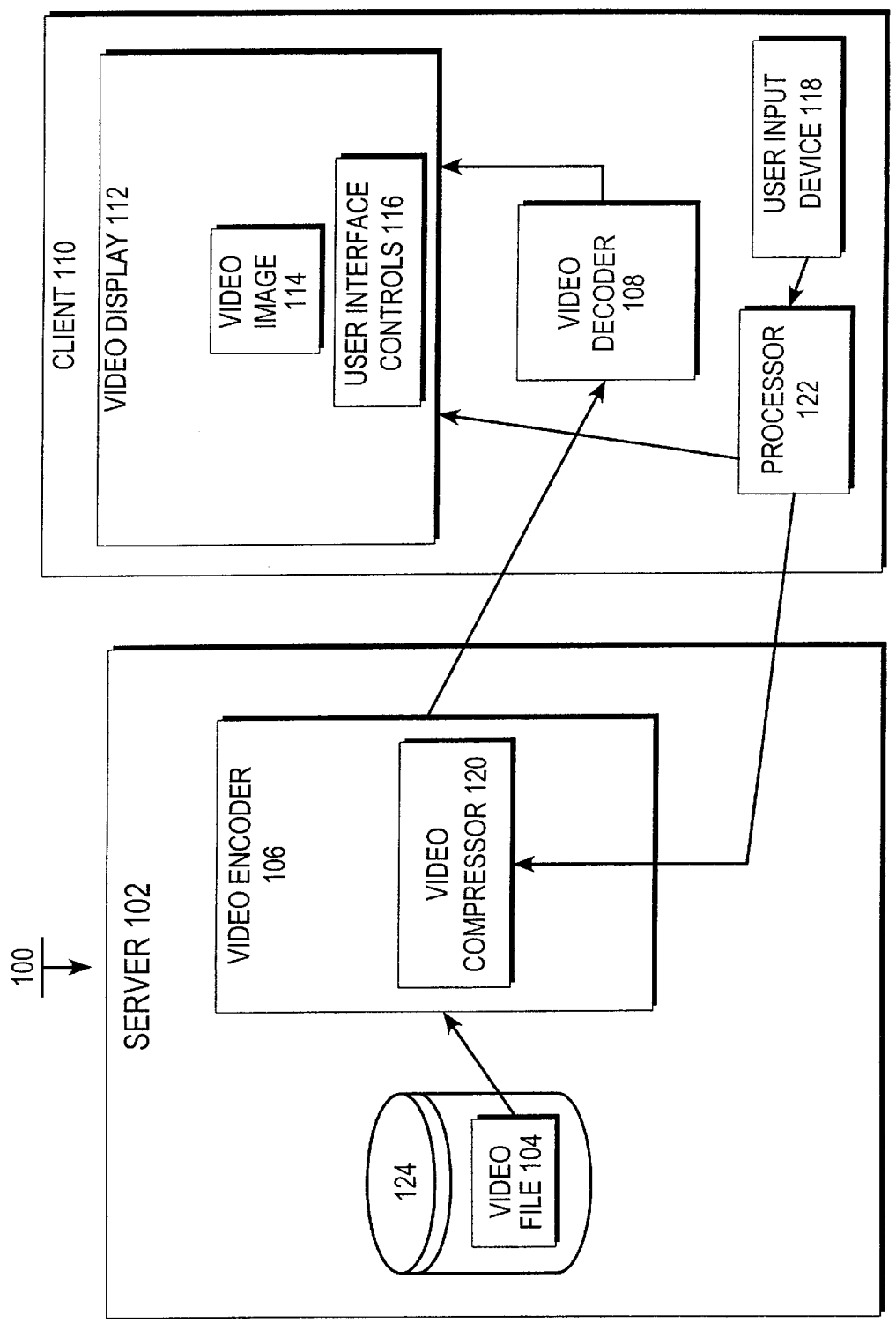
FIG. 1A is a block diagram of a digital video delivery system that uses on-the-fly compression according to an embodiment of the invention.
Figure 1B:
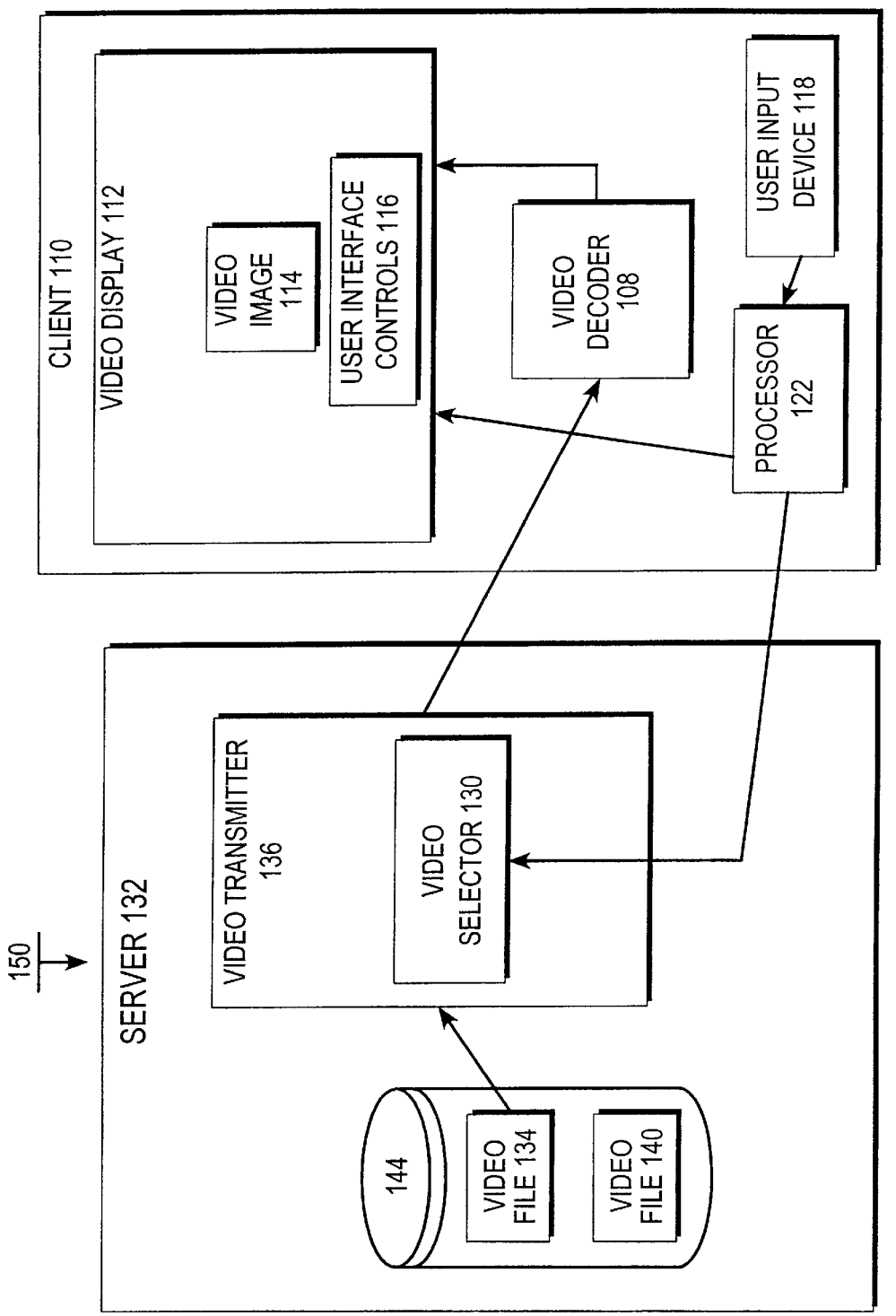
FIG. 1B is a block diagram of a digital video delivery system that uses pre-compressed video data according to an embodiment of the invention.

Referring to FIG. 1A, it is a block diagram of a digital video delivery system 100 upon which an embodiment of the present invention can be implemented. System 100 includes a server 102 and a client 110. Server 102 generally includes a storage device 124 and a video encoder 106. Storage device 124 stores a video file 104. Video encoder 106 encodes video into a digital stream using on-the-fly compression, and therefore includes a video compressor 120.

Server 102 is coupled to client 110 through a communication medium that supports the transport of digital data. Server 102 may be, for example, a web server on the internet and client 110 may be connected to the internet through a dial-up connection. Alternatively, server 102 and client 110 may both be workstations on a local area network. The present invention is not limited to any particular communication medium or network environment.

Client 110 generally includes a video display 112, a video decoder 108, a processor 122 and a user input device 118. Video display 112 generally represents any device capable of displaying digital information. Video decoder 108 is configured to decode a digital video stream and display the resulting video images on video display 112. In an Internet or Intranet environment, video decoder 108 may be, for example, implemented in an HTTP client, commonly referred to as a "web browser". Decoder 108 may be coded as part of the web browser itself, or may be implemented as a "plug in" that is dynamically linked to a web browser.

In FIG. 1A, video decoder 108 is decoding the digital video stream received from video encoder 106 and transmitting a signal to video display 112 to cause a video image 114 decoded from the video stream to be displayed on video display 112.

Processor 122 generally represents one or more processors that belong to client 110. Processor 122 executes sequences of instructions contained in the dynamic memory of client 110. For the purposes of explanation, video decoder 108 is shown separate from processor 122. However, video decoder 108 may be implemented in hardware, software, or a combination of hardware and software. When implemented by software, the functions of video decoder 108 may be performed by causing processor 122 to execute sequences of instructions for decoding a video stream.

User input device 118 generally represents one or more devices for receiving input from a user. For example, user input device 118 may include a keyboard, a mouse, a track-ball, a touch pad, and/or a pen input device. In response to user input from the user input device 118, processor 122 may cause a cursor to move on video display 112. By manipulating user input device 118, a user may interact with user interface controls 116 generated on video display by processor 122.

USER INTERFACE CONTROLS

As mentioned above, processor 122 executes instructions which cause user interface controls 116 to be displayed on video display 112. According to one embodiment of the invention, the user interface controls 116 generated by processor 122 include controls similar to those found on a video cassette recorder. Such controls may include, for example, a forward button, a rewind button, a slow button, a pause button, and a slow motion button. A user interacts with these control using user input device 118. As shall be described in greater detail hereafter, processor 122 transmits messages to server 102 that affect the encoding of the video stream in response to certain user interactions with the user interface controls 116.

MAXIMIZING BANDWIDTH USAGE DURING SLOW MOTION

According to one embodiment of the invention, server 102 initially determines the compression ratio that video compressor 120 will use to deliver the video contained in video file 104 to client 110 based on a specified frame delivery rate and the bandwidth between server 102 and client 10. The lower the bandwidth, the higher the compression ratio used by video compressor 120 and the lower the quality of the video image 114 displayed on video display 112.

When the user enters user input through user input device 118 that selects the "slow" button displayed in the user interface controls 116, processor 122 transmits a message to server 102 that indicates a new frame transmission rate. In prior art video delivery systems, the video encoder would simply respond by sending data at a slower rate. Consequently, the bandwidth that is fully utilized during normal rate playback is under-utilized during slow speed playback.

According to an embodiment of the present invention, video encoder 106 dynamically adjusts the compression ratio used by video compressor 120 during slow playback to fully utilize the available bandwidth to client 110. The slower the frame rate specified by the user, the lower the compression ratio employed by the video encoder. Consequently, a higher quality image will be displayed on video display 112 during slow motion playback.

When a user selects the "pause" button on the user interface controls 116, the client pauses playback of the video. The user may select a "camera" control to obtain a high quality digital image of the frame currently being displayed, as shall be described in greater detail hereafter.

PROVIDING HIGH QUALITY SNAPSHOTS

According to one embodiment of the invention, user interface controls 116 include a button that depicts a camera. When a user selects the camera button, processor 122 transmits a message to server 102 to indicate that the camera button was selected. The message also includes data that identifies the particular frame displayed in video image 114 when the camera button was selected. The frame may be identified, for example, by a frame number or by an offset value into the video file 104. The value used to identify each frame is contained within the video stream transmitted from server 102. The present invention is not limited to any particular format in which to represent the displayed frame.

In response to the message from client 110, video compressor 120 locates the frame specified in the message and transmits the video information that corresponds to the frame from video file 104 with little or no compression. Consequently, the client 110 will receive a still "snapshot" of the specified frame that has a much higher resolution and quality than when the same frame was delivered to client 110 in real time. For example, the resolution of the video sent during normal speed realtime playback may be 160 by 120 pixels, while the resolution of the image sent when the camera button is selected may be 640 by 480 pixels.

According to one embodiment, the user will receive a still frame of the highest quality that can be produced by video file 104, which may itself store the video in a slightly compressed format. According to an alternative embodiment, the user is provided controls for specifying the quality of the snapshot. Because the frame delivery rate is or becomes zero when the camera button is selected, the quality and resolution of the image sent in response to selection of the camera button may be selected independent of the bandwidth between the server and the client.

NON-HIERARCHICAL VIDEO DELIVERY SYSTEMS

FIG. 1B is a block diagram of a digital video delivery system 150 that includes a server 132 and client 110. Video server 132 includes a video transmitter 136 for transmitting a video stream that has been pre-compressed using, for example, MPEG-2 compression techniques. Video server 132 further includes a storage 144 that contains multiple versions of a video. In the illustrated example, storage 144 contains a video file 134 that has been pre-compressed using one compression ratio, and a second video file 140 that has been pre-compressed using a different, lower compression ratio. Because video file 140 has been compressed with a lower compression ratio than video file 134, the images represented in video file 140 have a higher resolution and higher quality than the corresponding images represented in video file 134. However, the amount of data contained in video file 140 is too great relative to the bandwidth between server 132 and client 110 for video file 140 to be viewed at client 110 in real-time.

According to an embodiment of the invention, server 132 is configured to switch between video file sources to provide increased quality slow motion and high quality snapshots. Specifically, server 132 initially determines which of video files 134 and 140 to transmit to client 110 based on a specified frame delivery rate and the bandwidth between server 132 and client 110. The lower the bandwidth, the higher the compression ratio of the video file selected by video transmitter 136 and the lower the quality of the video image 114 displayed on video display 112.

For the purposes of explanation, it shall be assumed that the bandwidth between server 132 and client 110 is such that only the highly compressed video file 134 can be delivered in real-time. Therefore, video selector 130 initially selects video file 134, and video transmitter 136 begins the transmission of data from video file 134.

When the user enters user input through user input device 118 that selects the "slow" button displayed in the user interface controls 116, processor 122 transmits a message to server 132 that indicates a new frame transmission rate. Upon receiving the new frame transmission rate, video transmitter 136 determines whether data from any less-compressed video file can be delivered in real-time at the slower frame transmission rate. If data from the less-compressed video file can be transmitted at the slower frame transmission rate, video selector 130 switches to the less-compressed video file. Video transmitter 136 then proceeds to transmit a video stream from the less-compressed video file. Consequently, a higher quality image will be displayed on video display 112 during slow motion playback.

Preferably, switching the input file at the server 132 does not cause a skip in the video as it is viewed at client 110. Therefore, server 132 stores data that indicates the correlation between the frames in video file 134 and the frames in video file 140. When video selector 130 switches from video file 134 to video file 140, video transmitter 106 begins transmission from video file 140 at a frame that corresponds to the last frame sent from video file 134.

When a user selects a button to switch from slow motion to normal speed playback, a message is sent to server 132. In response to the message, video selector 130 switches to the more highly compressed video file 134. The data indicating the correlation between the frames of video files 134 and 140 are again accessed to determine the appropriate frame at which to begin transmission from video file 134.

When a user selects the "pause" button on the user interface controls 116, the client pauses playback of the video. When a user selects the camera button, processor 122 transmits a message to server 132 to indicate that the camera button was selected. The message also includes data that identifies the particular frame displayed in video image 114 when the camera button was selected. In response to the message from client 110, video selector 130 locates the frame within the least-compressed video file that corresponds to the frame specified in the message. Video transmitter 106 then transmits the video information that corresponds to the frame from the least-compressed video file. Consequently, the client 110 will receive a still "snapshot"

of the specified frame that has a much higher resolution and quality than when the same frame was delivered to client 110 in real time.

Preferably, video files 134 and 140 are compressed using a compression technique that allows a user to scroll through the compressed video bidirectionally. Under these conditions, a user may operate the user interface controls 116 to move through the video sequence both forward and back, with slow motion and pause controls to find the exact frame desired for a snapshot. A high resolution version of that frame is then sent to the client 110 when the camera button is selected, as explained above.

In the foregoing description, storage 144 includes only two versions of the video being viewed at the client 110. However, storage 144 may include any number of versions, each of which is pre-compressed using a different compression ratio. Under these conditions, video selector 130 selects the video file with the lowest compression ratio that can be transmitted over the available bandwidth at the specified frame display rate. As the user decreases the frame rate during playback, the video selector dynamically switches to video files with lower compression ratios. According to one embodiment, the video file with the lowest compression ratio is always used to transmit a snapshot back to the client 110 in response to selection of the camera button.

DIGITAL VIDEO DELIVERY OPERATION

Figure 2A:
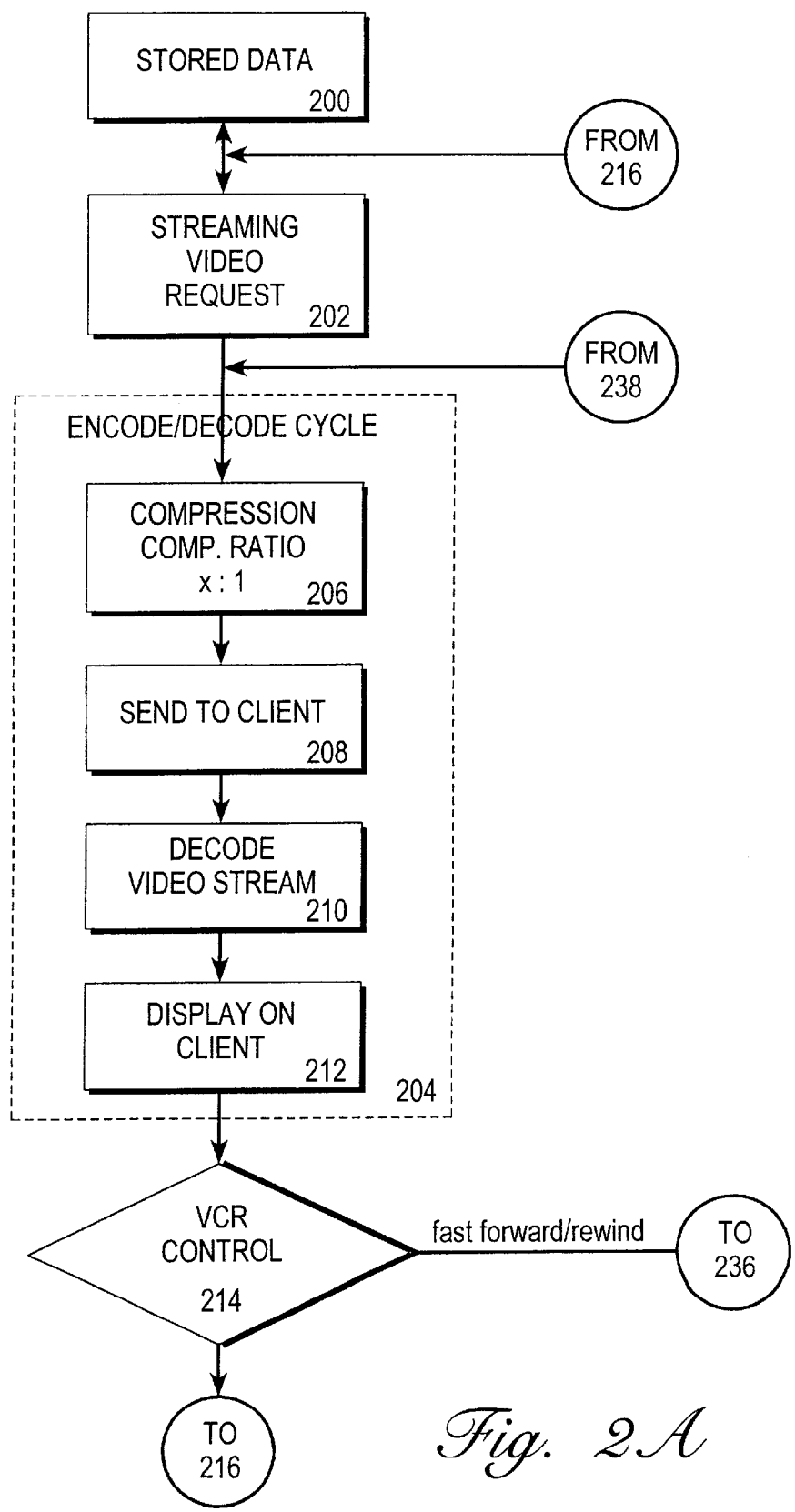
FIG. 2A is a portion of a flow chart that illustrates the operation of a digital video delivery system according to an embodiment of the present invention.
Figure 2B:
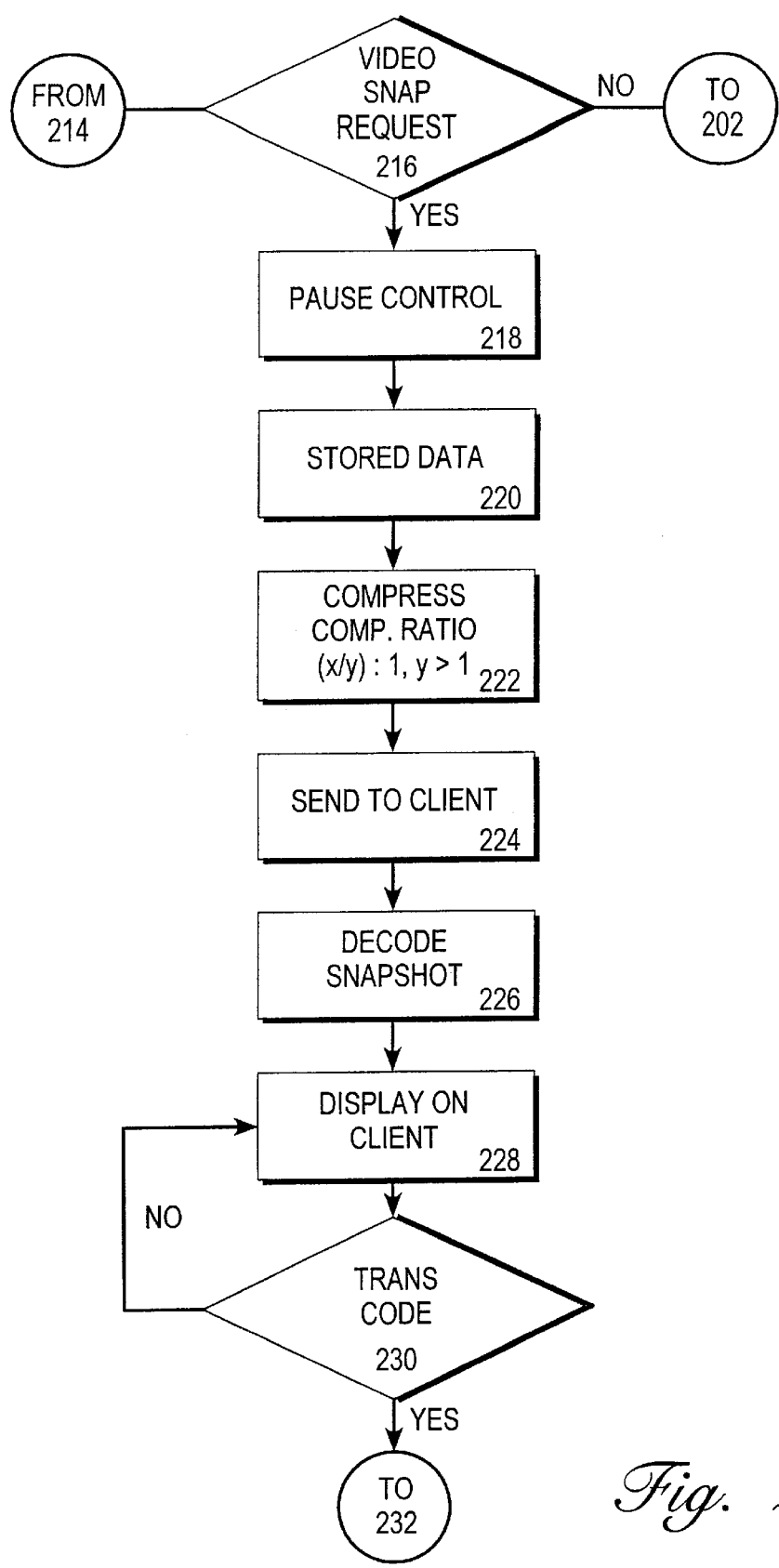
FIG. 2B is another portion of the flow chart illustrated in FIG. 2A.
Figure 2C:
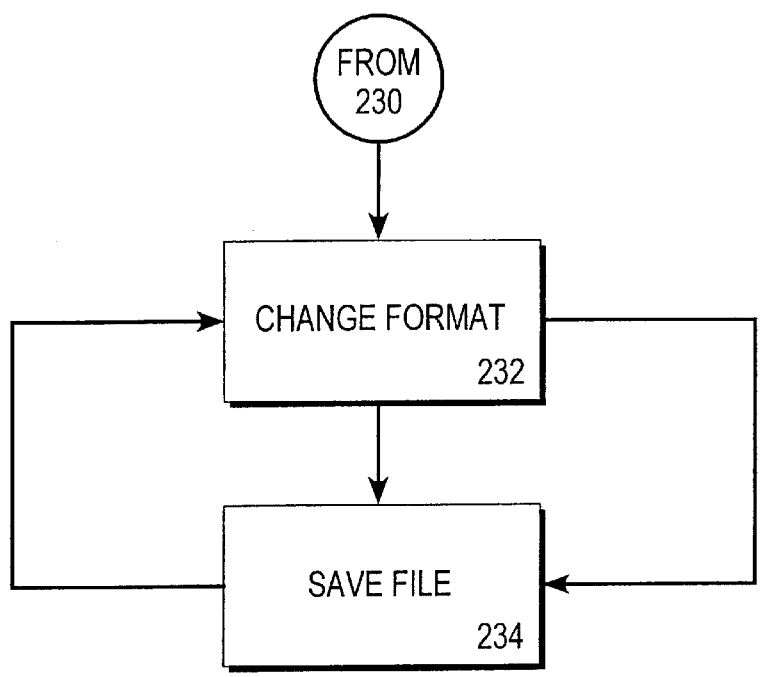
FIG. 2C is another portion of the flow chart illustrated in FIG. 2A.
Figure 2C:
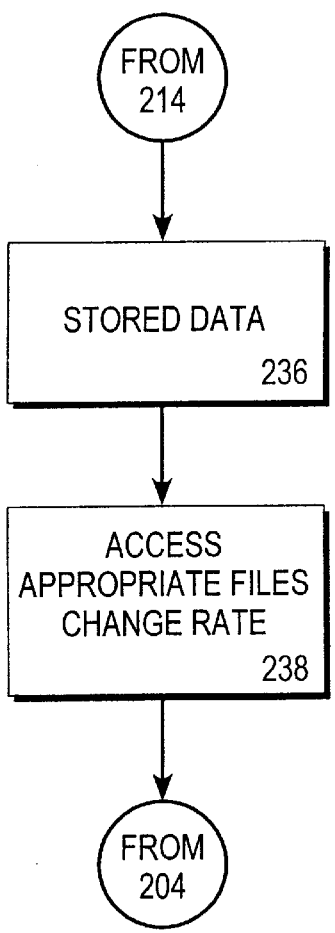

FIGS. 2A, 2B and 2C contain a flow chart that illustrates the steps performed by a digital video delivery system according to an embodiment of the invention that uses on-the-fly compression. Block 200 generally represents digital video data stored on a storage device of a video server. The digital data may be uncompressed or pre-compressed. However, if the video data is pre-compressed, it is not pre-compressed to the degree required to be able to transmit the video to a client for normal-speed playback in real time. Consequently, some additional on-the-fly compression must be performed to send the video to the client for normal-speed, real-time playback.

At step 202, the server receives a request to begin streaming video to a client. From step 202, control proceeds to block 204. Block 204 generally represents a steady state in which the video data is compressed (step 206), sent to the client (step 208), decoded at the client (step 210) and displayed at the client (step 212). The compression ratio (X:1) used to compress the data at step 206 is determined based on the bandwidth between the server and the client and a specific frame transmission rate. Specifically, the compression must be such that the bandwidth is able to carry video to the server at the specified frame rate. The on-the-fly compression ratio will be less for video data that has been pre-compressed.

At step 214, the server receives a message from the client that indicates that a user at the client has selected a control on the VCR-like user interface controls displayed on the client. If the message indicates that a user has selected a fast forward or rewind control, control passes to step 236. If the message indicates that the user has selected something other than a fast forward or rewind control, control passes to step 216.

At step 216, it is determined whether the message indicates that the user has selected a "video snap" control. Selection of the video snap control indicates that the user desires a quality snapshot of the video currently being viewed by the user. If the message indicates that the user has selected the video snap control, control passes to step 218. Otherwise, control passes back to step 202.

At step 218, the server pauses the transmission of video to the client. At step 220, the video data that is stored on the server is accessed to acquire the video data for the frame currently displayed at the client. However, the retrieved video data is not compressed using the same compression ratio X:1 as was used at step 206. Rather, at step 222 the retrieved video data for the selected frame is compressed using a compression ratio X/Y:1, where Y>1. Consequently, the image represented in the video data will have a higher image quality and resolution than the corresponding image that was sent to the user in the real-time video stream.

According to one embodiment, the user at the client is able to specify options relating to the quality of the images that will be generated in response to selection of the video snap control. The message sent to the server when the user selects the video snap control contains data that indicates the selected quality. The selected quality is then used to select the compression ratio used at step 222. The user may specify the quality in a variety of ways, including specifying a desired resolution or a desired compression ratio. The present invention is not limited to any particular form of specifying the image quality of snapshots.

At step 224, the less-compressed (or uncompressed) data for the selected frame of video is transmitted from the server to the client. At step 228, the high resolution image is decoded at the client from the less-compressed video data and displayed at the client. Control then proceeds to step 230.

At step 230, the user may convert ("transcode") the high resolution snapshot to a specified image format, such as JPEG, PCX, BMP, TIFF, etc. If the user transcodes the image, the image is converted to the appropriate format at step 232 and saved at step 234. This process may be repeated to create any number of stored copies of the image.

As mentioned above, control passes to step 236 when the user has selected either fast forward or rewind. At steps 236 and 238 the server accesses the appropriate files on the stored data. In addition, the compression ratio and the frame transmission rate are adjusted as appropriate to the specified operation. Control then proceeds to the encode/decode cycle illustrated at block 204.

For digital video distribution systems that transmit video that has been pre-compressed, the steps are only slightly changed. Specifically, at step 206 a source video file is selected based on the pre-compression ratio of the video file and the bandwidth available to transmit the video to the client. At step 222, a video file that is pre-compressed with a lower pre-compression ratio than the video file selected at step 206 is selected. Data from that less-compressed file is transmitted at step 224.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for delivering video from a server to a client over a communication medium with a limited bandwidth, the method comprising the steps of:

determining, based on a predetermined frame rate and said limited bandwidth, an initial image quality to display said video at said client;

while transmitting said video having said initial image quality to said client, determining a second image quality to display said video at said client based on a second frame rate and said limited bandwidth, where said second frame rate is different from said initial frame rate; and transmitting said video with said second image quality to said client.

2. The method of claim 1 wherein:

the step of determining an initial image quality includes the step of determining an image quality that allows said video to be displayed in real time at said predetermined frame rate over said limited bandwidth; and the step of determining a second image quality includes the step of determining an image quality that allows said video to be displayed in real time at said second frame rate over said limited bandwidth.

3. The method of claim 1 wherein:

the step of determining an initial image quality includes the step of determining based on said predetermined frame rate and said limited bandwidth an initial compression ratio to display said video at said client;

the method includes the step of compressing said video at said server using said initial compression ratio while transmitting said video to said client;

the step of determining a second image quality includes the step of determining based on said second frame rate and said limited bandwidth a second compression ratio to display said video at said client, wherein said second compression ratio is lower than said initial compression ratio; and the method includes the step of compressing said video at said server using said second compression ratio while transmitting said video to said client.

4. The method of claim 3 further comprising the steps of:

while transmitting said video to said client at said predetermined frame rate, receiving at said server a message from said client that indicates selection of said second frame rate that is decreased relative to said predetermined frame rate;

wherein the step of transmitting said video with said second image quality is performed in response to said message from said client;

receiving at said server a second message from said client;

in response to said second message, transmitting to said client from said server a frame of said video without compressing said video.

5. The method of claim 4 further comprising the steps of:

displaying a pause control at said client while said client is displaying said video; and causing said client to transmit said second message in response to user selection of said pause control.

6. The method of claim 1 wherein:

the step of determining an initial image quality includes the step of selecting a first pre-compressed video file from a plurality of pre-compressed video files, wherein each of said plurality of pre-compressed video files is compressed using a different compression ratio;

the step of transmitting said video with said initial image quality to said client includes transmitting data from said first pre-compressed video file;

the step of determining a second image quality includes the step of selecting a second pre-compressed video file from said plurality of pre-compressed video files, wherein said second pre-compressed video file is pre-compressed using compression ratio which is lower than the compression ratio used to pre-compress said first pre-compressed video file; and the step of transmitting said video with said second image quality includes transmitting said data from said second pre-compressed video file.

7. The method of claim 6 further comprising the steps of:

while transmitting said video to said client at said predetermined frame rate, receiving at said server a message from said client that indicates selection of said second frame rate that is decreased relative to said predetermined frame rate;

wherein the step of transmitting said video with said second image quality is performed in response to said message from said client;

receiving at said server a second message from said client;

in response to said second message, transmitting to said client from said server a frame of said video from a less compressed video file of said plurality of pre-compressed video files.

8. The method of claim 1 further comprising the steps of:

while transmitting said video to said client at said predetermined frame rate, receiving at said server a message from said client that indicates selection of said second frame rate that is decreased relative to said predetermined frame rate; and wherein the step of transmitting said video with said second image quality is performed in response to said message from said client.

9. The method of claim 8 further comprising the steps of:

generating at the client a set of user interface objects while displaying said video to a user; and in response to user selection of one of said user interface objects, generating said message and transmitting said message to said server.

10. The method of claim 9 wherein:

said set of user interface objects includes a slow motion control; and said message is generated and transmitted to said server in response to user selection of said slow motion control.

11. A method for delivering video from a server to a client over a communication medium with a limited bandwidth, the method comprising the steps of:

transmitting a stream of video from the server to the client to be displayed on a display device at said client;

receiving a predetermined user input at said client;

in response to said predetermined user input at the client, transmitting a message from the client to the server that indicates a particular frame in said video that was transmitted to said client;

in response to receiving the message at the server, transmitting from the server to the client data depicting an image represented in said frame, wherein said data represents said image in greater detail than said image is represented in said frame of said video transmitted to said client; and displaying said image on said display device of said client in said greater detail based on said data.

12. The method of claim 11 further comprising the steps of:

in response to user input at the client, scrolling through the video at the client; and wherein the step of transmitting a message from the client to the server that indicates a particular frame in said video includes transmitting from the client to the server a message that indicates a frame of said video that is being displayed at said client when said user enters said predetermined user input.

13. The method of claim 11 further comprising the steps of:

displaying user interface controls at said client while said client receives said stream of video from said server;

wherein said step of receiving a predetermined user input at said client includes the step of detecting user selection of a control of said user interface controls.

14. The method of claim 13 wherein:

said user interface controls include a control for scrolling said stream of video forward, a control for scrolling said stream of video backward, and a pause control; and said step of detecting user selection of a control includes detecting selection of said pause control.

15. The method of claim 11 wherein:

the step of transmitting a stream of video from the server to the client includes transmitting said stream of video while compressing said video at a first compression ratio; and the step of transmitting from the server to the client data depicting an image represented in said frame comprises the steps of transmitting a portion of said video that corresponds to said frame of video while compressing said video at a second compression ratio that is different than said first compression ratio.

16. The method of claim 11 wherein:

the step of transmitting a stream of video from the server to the client includes transmitting said stream of video from a video file that has been pre-compressed using a first compression ratio; and the step of transmitting from the server to the client data depicting an image represented in said frame comprises the steps of transmitting a portion of said video that corresponds to said frame of video from a second video file that has been pre-compressed using a second compression ratio that is different than said first compression ratio.

17. The method of claim 11 wherein:

the step of transmitting a stream of video from the server to the client includes transmitting said stream of video from a video file that represents said video at a first resolution; and the step of transmitting from the server to the client data depicting an image represented in said frame comprises the steps of transmitting a portion of said video that corresponds to said frame of video from a second video file that represents said video at a second resolution that is different than said first resolution.

18. A computer readable medium having stored thereon sequences of instructions for delivering video from a server to a client over a communication medium with a limited bandwidth, the sequences of instructions including sequences of instructions which, when executed by a processor, cause said processor to perform the steps of:

transmitting a stream of video from the server to the client to be displayed on a display device at said client;

receiving a predetermined user input at said client;

in response to said predetermined user input at the client, transmitting a message from the client to the server that indicates a particular frame in said video that was transmitted to said client;

in response to receiving the message at the server, transmitting from the server to the client data depicting an image represented in said frame, wherein said data represents said image in a different level of detail than said image is represented in said frame of said video transmitted to said client, and displaying said image on said display device of said client in said greater detail based on said data.

19. The computer readable medium of claim 18 further comprising sequences of instructions for performing the steps of:

in response to user input at the client, scolling through the video at the client; and wherein the step of transmitting a message from the client to the server that indicates a particular frame in said video includes transmitting from the client to the server a message that indicates a frame of said video that is being displayed at said client when said user enters said predetermined user input.

20. The computer readable medium of claim 18 further comprising sequences of instructions for performing the steps of:

displaying user interface controls at said client while said client receives said stream of video from said server;

wherein said step of receiving a predetermined user input at said client includes the step of detecting user selection of a control of said user interface controls.

21. The computer readable medium of claim 20 wherein:

said user interface controls include a control for scrolling said stream of video forward, a control for scrolling said stream of video backward, and a pause control; and said step of detecting user selection of a control includes detecting selection of said pause control.

22. The computer readable medium of claim 20 wherein:

the step of transmitting a stream of video from the server to the client includes transmitting said stream of video while compressing said video at a first compression ratio; and the step of transmitting from the server to the client data depicting an image represented in said frame comprises the steps of transmitting a portion of said video that corresponds to said frame of video while compressing said video at a second compression ratio that is different than said first compression ratio.

23. The computer readable medium of claim 18 wherein:

the step of transmitting a stream of video from the server to the client includes transmitting said stream of video from a video file that has been pre-compressed using a first compression ratio; and the step of transmitting from the server to the client data depicting an image represented in said frame comprises the steps of transmitting a portion of said video that corresponds to said frame of video from a second video file that has been pre-compressed using a second compression ratio that is different than said first compression ratio.

24. The computer readable medium of claim 18 wherein:

the step of transmitting a stream of video from the server to the client includes transmitting said stream of video from a video file that represents said video at a first resolution; and the step of transmitting from the server to the client data depicting an image represented in said frame comprises the steps of transmitting a portion of said video that corresponds to said frame of video from a second video file that represents said video at a second resolution that is different than said first resolution.

25. A method for presenting visual information at a client connected to a communication line, the method comprising the steps of:

sending to said client over said communication line a stream of video in a signal that reflects an initial quality;

playing said stream of video on a display device at said client;

transmitting to said client over said communication line an image associated with a transmitted portion of said stream of video; and displaying said image on said display device of said client, wherein said image has a higher quality than said transmitted portion of said stream of video with which said image is associated, and wherein said image has substantially the same visual content as the transmitted portion of said stream of video with which said image is associated.

26. The method of claim 25 further comprising the step of constructing said stream of video and said image from a common source of video data.

27. The method of claim 25 wherein the step of playing said stream of video is performed while said stream of video is received over said communication line.

28. The method of claim 25 wherein;

the step of sending to said client a stream of video is performed by sending to said client a stream of video from a first set of one or more sources; and the step of transmitting to said client an image is performed by transmitting to said client an image constructed from a second set of one or more sources, wherein said second set of one or more sources includes at least one source that does not belong to said first set of one or more sources.

29. A method for delivering video from a server to a client over a communication medium with a limited bandwidth, the method comprising the steps of:

transmitting a stream of video from the server to the client to be displayed on a display device at said client;

receiving at said server a message from the client that indicates a particular frame in said video that was transmitted to said client;

in response to receiving the message at the server, transmitting from the server to the client data depicting an image represented in said frame, wherein said data represents said image in greater detail than said image is represented in said frame of said video transmitted to said client; and displaying said image based on said data on said display device of said client.

30. The method of claim 29, wherein the step of receiving a message from the client is performed by receiving a message that was sent by the client in response to user input entered at the client.

* * * * *